Sept. 1, 1970          M. M. HATTIS          3,526,364
LIGHTWEIGHT MOBILE SPRINKLER UNIT
Filed Sept. 18, 1968          2 Sheets-Sheet 1
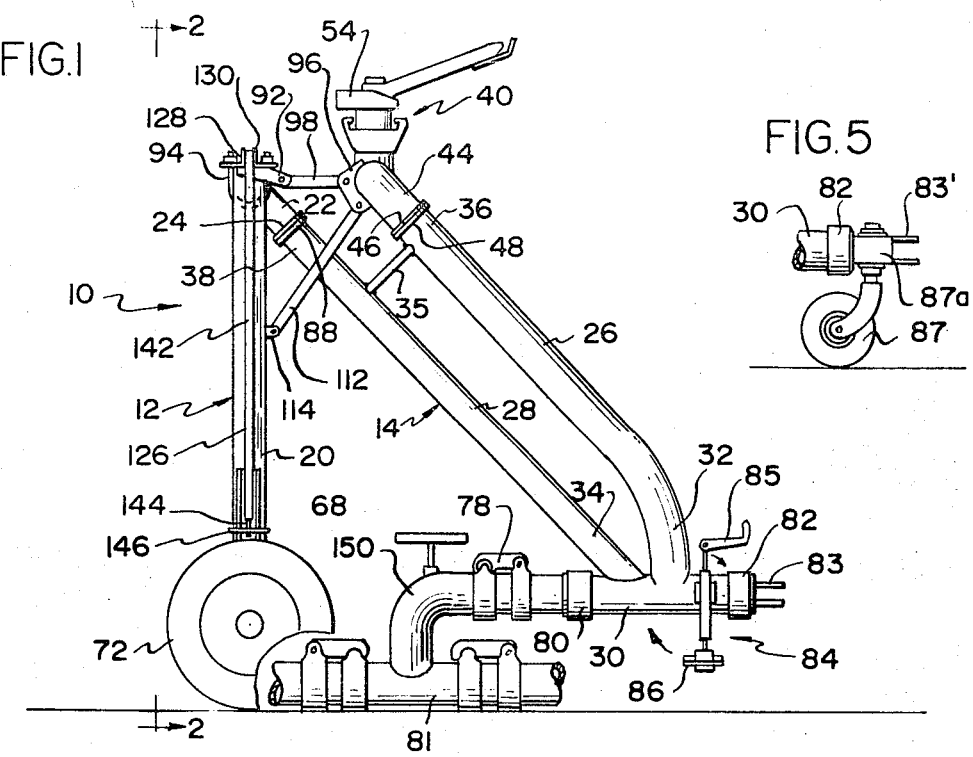
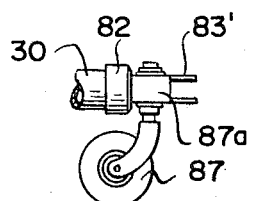
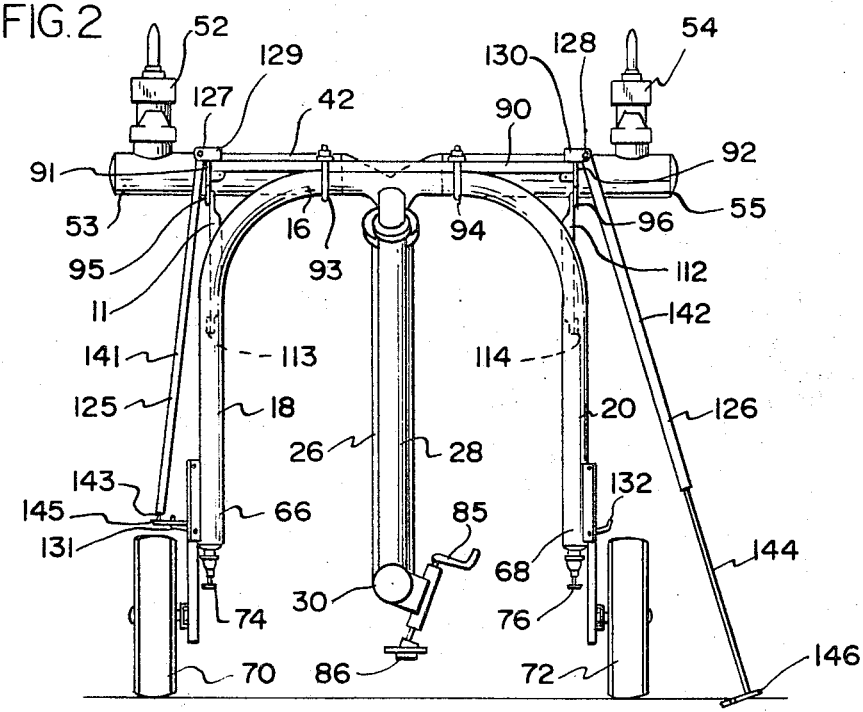
INVENTOR.
MORLEY M. HATTIS
BY Dreist, Torhwood, Greenawalt & Dewey
ATTORNEYS.

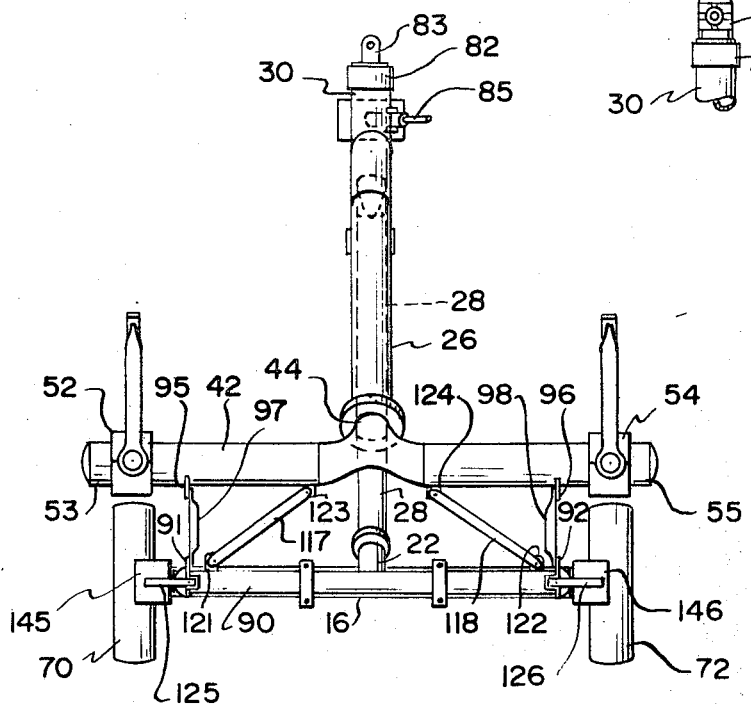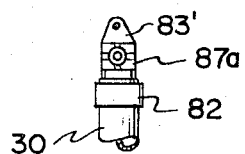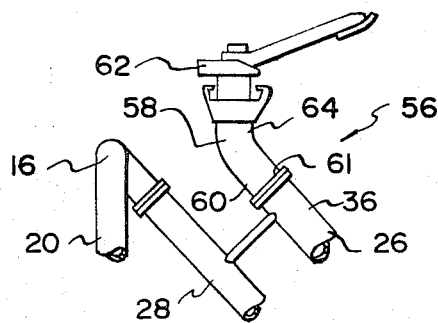

United States Patent Office 3,526,364
Patented Sept. 1, 1970

3,526,364
LIGHTWEIGHT MOBILE SPRINKLER UNIT
Morley M. Hattis, Chicago, Ill., assignor, by mesne assignments, to White Farm Equipment Company, Chicago, Ill., a corporation of Delaware
Filed Sept. 18, 1968, Ser. No. 763,051
Int. Cl. B05b *15/06*
U.S. Cl. 239—212                                16 Claims

ABSTRACT OF THE DISCLOSURE

A lightweight mobile sprinkler unit for irrigating crops and the like, comprising lightweight tubular members which are detachable for shipping and which are hollow so that they can be filled with water at the sprinkling site to provide ballast weight for stabilizing the sprinkler unit when it is in operation. The tubular members may be constructed and arranged so that the unit can be used to irrigate crops of appreciable height such as corn with minimal damage to the crop. Preferably, the unit includes two detachable frame sections, the first section being in the form of an upwardly extending generally inverted, U-shaped frame section and the second section being in the form of a generally vertical frame section which is connected to and extends from the bight portion of the U-shaped frame section. One or more sprinklers are connected to the upper end of the second frame section.

BACKGROUND OF THE INVENTION

Field of the invention

This invention relates to large sprinkler units for irrigating crops, grass, nursery stock and the like and for spreading fertilizer, fungicide, herbicide, insecticide and the like. The field of the invention is that of lightweight mobile sprinkler units having a large sprinkling capacity. The field is also that of mobile lightweight sprinkler units for use with tall crops such as corn where the unit is moved through the crop field with minimum disturbance or damage to the crop.

Description of the prior art

Over the years numerous mobile sprinkling systems of various sizes and shapes have been proposed for irrigation. These systems have been concerned with the problem of providing a simple means, lightweight and mobile, for irrigating a large area of land in the shortest possible time with a minimum of effort. At one time the easiest way to irrigate a section of land was by laying out a long irrigation pipe, having sprinklers thereon at spaced intervals, over a portion of the land to be sprinkled. After that portion of land was adequately sprinkled, the irrigation pipe was moved by hand to the next portion to be sprinkled. Hand moving of the pipe was laborious, time consuming and a generally disagreeable job. Not only did the pipe have a certain amount of weight but also, since it was generally moved from a freshly irrigated place, the land was particularly muddy and difficult to walk through. Thus many of these systems provide means for moving a long irrigation pipe over the field to be irrigated.

One such system utilized a series of large wheels mounted on a hollow shaft which formed an irrigation pipe line as shown in the Cornelius et al. U.S. Pat. 3,211,383. Sprinklers were attached to the pipe line between the wheels and the whole unit was rotated from place to place for sprinkling. Another system comprised a mobile sprinkler unit which was moved along a water ditch pumping water from the ditch and sprinkling it on either side of the unit as shown in the Nugent U.S. Pat. No. 3,009,645. Still another system utilized a mobile sprinkler unit comprising extending boom portions as shown in Spann et al. U.S. Pat. No. 2,977,052 and Sherman U.S. Pat No. 2,988,287. One end of an irrigation pipe was connected to the unit. The unit was then pulled across the field at a slow rate by winch means.

Over the years, the systems proposed have attempted to provide solutions to the problem mentioned above. However, the problem is a relative one as are the solutions proposed so far and there is still room for further improvements. Also the prior art irrigation systems have not always contemplated (or provided for) irrigating tall crops.

SUMMARY OF THE INVENTION

In order to provide a simple means, lightweight and mobile, for irrigating a large area of land in a relatively short time with a minimum of effort, the present invention was developed. Accordingly, one object of the present invention is to provide a lightweight mobile sprinkler unit of relatively large capacity for irrigating crops and the like.

A further object of the invention is to provide a lightweight mobile sprinkler unit comprising detachable frame members whereby the sprinkler unit can be easily assembled in the field in a short time without previous experience or instructions, using readily available tools.

It is a still further object of the invention to provide a lightweight mobile sprinkler unit comprising detachable frame members whereby the sprinkler unit may be easily broken down and packaged for shipment and then reassembled in a very short time for sprinkling operation.

It is another object of this invention to provide a lightweight mobile sprinkling unit comprising hollow tubular frame members which are filled with water when the sprinkler unit is connected to a source of water under pressure to provide ballast weight for the sprinkler unit when it is in operation.

It is still another object of this invention to provide a lightweight mobile sprinkler unit wherein the flow of water through the unit is reversed to stabilize the sprinkler unit in its sprinkling position.

It is still another object of this invention to provide a sprinkler unit designed to irrigate crops of appreciable height and adapted for movement through these crops with minimal damage to the crops.

It is still another object of this invention to provide a lightweight sprinkler unit which can be simply and easily moved with only a small amount of power by a garden tractor, by a winch or by hand.

It is still another object of this invention to provide a lightweight sprinkler unit having a basic design which can be used for different capacity units, which with or without modification, can be used for a self propelled unit or for a unit moved by a small tractor, by winch or by hand, and which provides a unit which presents a very narrow profile to the crops through which it is moved and with no wide portions extending in the path of movement of the unit which, if present, could cause significant damage to the crops in the path of movement of the unit.

The invention achieves its objects, and other objects and advantages including those inherent therein, by providing a sprinkler unit comprising a first, generally upright, inverted, U-shaped, tubular frame section having a bight portion and two leg portions with a wheel connected to the lower end of each leg portion, a second generally vertical, frame section including a short tubular member and an inclined tubular member, the lower end of the inclined member being connected to and opening into the short tubular member, the upper end of the second frame section being detachably connected to the bight portion of the first frame section, and the short tubular member having a coupling for connection to a source of water under pressure, and sprinkler means detachably connected to the upper end of the inclined tubular member.

The invention achieves other of its objects by providing: a second tubular member forming part of the generally vertical frame section and adapted for fluid-type connection with he bight portion of the U-shaped member; drain valve means at the lower ends of said leg portions to drain the U-shaped tubular member when the coupling is disconnected from the source of water under pressure; means for reversing the flow of water through the sprinkling unit; and hitch means for connecting the unit to a power means, such as a tractor, for moving the sprinkler unit to sprinkling positions.

These and other objects and advantages of the invention will become apparent to one skilled in the art from the following description taken in conjunction with the accompanying drawings.

BRIEF DESCRIPTION OF THE DRAWINGS

FIG. 1 is a side elevational view of the sprinkler unit of this invention;

FIG. 2 is an end elevational view of the sprinkler unit taken along lines 2—2 of FIG. 1;

FIG. 3 is a top plan view of the sprinkler unit shown in FIG. 1;

FIG. 4 is a side elevational view of a modified form of sprinkling means for use with the sprinkler unit shown in FIG. 1;

FIG. 5 is a side elevational view of a modified end portion of the sprinkler unit shown in FIG. 1;

FIG. 6 is a top plan view of the end portion shown in FIG. 5.

DESCRIPTION OF THE PREFERRED EMBODIMENTS OF THE INVENTION

Referring to FIG. 1, a sprinkler unit of one embodiment of this invention is generally indicated at 10. The basic components of the sprinkler unit 10 are first and second frame sections 12 and 14. The first frame section 12 is an upwardly extending, generally upright, inverted U-shaped tubular member having a bight portion 16 and two leg portions 18 and 20. The bight portion 16 has a short tubular extension 22 with an end flange 24 for fluid coupling the bight portion 16 to the second frame section 14. Although a U-shape is preferred for the first frame section 12, it could be a V-shape if desired.

The second frame section 14 comprises a first or upper inclined tubular member 26, a second or lower inclined tubular member 28 and a short horizontal tubular member 30 interconnecting the lower ends 32 and 34, respectively, of the upper and lower inclined tubular members 26 and 28. A generally upright strut 35 is secured to the first and second inclined tubular members 26 and 28 at a point near the upper ends 36 and 38 of the first and second inclined tubular members 26 and 28 to rigidly fix the inclined tubular members 26 and 28 with respect to each other.

A multiple sprinkler means 40 is detachably mounted on the upper end 36 of the upper inclined tubular member 26. The multiple sprinkler means 40 comprises a sprinkler pipe 42 having a short tubular extension 44 with an end flange 46 for connection to a similar end flange 48 on the upper end of the upper inclined tubular member 26. The sprinkler pipe 42 is adapted for mounting a plurality of sprinklers. In FIG. 1, two sprinklers 52 and 54 are indicated at each end 53 and 55 of the sprinkler pipe 42.

In FIG. 4, an alternative sprinkler means 56 is shown connected to the upper end 36 of the upper inclined tubular member 26. In this modification, sprinkler means 56 includes a curved pipe section 58 connected at one end 60 by an end flange 61 directly to the upper end 36 of the first inclined tubular member 26 and a single sprinkler 62 connected to the other end 64 of the curved pipe section 58.

Referring again to FIG. 1, at the lower ends 66 and 68 of each leg portion 18 and 20, two wheels 70 and 72 are mounted. Automatic drain or dump valves 74 and 76 are connected to the lower ends 66 and 68 of the leg portions 18 and 20. The automatic drain valves 74 and 76 may be of known commercial type which will close and remain closed when under a pressure greater than the head pressure of the height of the leg portions 18 and 20 and which will open under lower pressure to drain the inverted U-shaped tubular member 12.

The short horizontal tubular member 30 extends fore and aft of the direction of movement of the unit. In other words, the axis of the horizontal tubular member 30 is generally perpendicular to a plane containing the inverted U-shaped member 12. A quick connect coupling or fitting 78 is provided at the end 80 of the short horizontal tubular member 30 which is closest to the inverted U-shaped member 12 and is adapted for connecting the unit to a source of water under pressure, such as to irrigation pipe line 81 shown in FIG. 1.

The other end 82 of the short horizontal tubular member 30 is closed and is provided with hitch means 83 for connection to suitable power means, e.g. a tractor, for moving the sprinkler unit 10 when it is assembled. Adjustable jack means 84 is secured to the short horizontal tubular member 30 to provide three point support for the sprinkler unit on the two wheels and the jack means. In FIGS. 1 and 2, a fast-operating screw jack is shown comprising a handle portion 85 and a rotatably retractable, rectangular or circular base support portion 86. As shown in FIG. 1 the jack means 84 can be rotated from its vertical operating position where it extends downwardly to an inoperative horizontal position where it is "out of the way" and will not engage or catch on objects on the ground beneath tubular member 30 when unit 10 is moved.

FIGS. 5 and 6 show a modified form of the invention where a caster wheel 87 is used in place of jack means 84. In this embodiment the caster wheel mounting 87a is secured to the end 82 of tubular member 30. If desired hitch means 83' can be secured to the caster wheel mounting 87a.

The lower end 32 of the upper or first inclined tubular member 26 is connected to the horizontal tubular member 30 at a point adjacent the closed end 82 thereof. The first or upper inclined member 26 inclines upwardly toward and then connects with the sprinkler pipe 42 or curved pipe section 58. For this purpose the upper end 36 of the upper inclined tubular member 26 is provided with the end flange 48 adapted for connection to end flange 46 or end flange 61 to provide a fluid-type coupling or connection between the upper inclined tubular member 26 and the sprinkler means 40 or 56.

When the sprinkler unit 10 is in operation, the direction of the flow of water into and through the sprinkler unit 10 will be reversed. The water will flow horizontally through the short horizontal tubular member 30 and then in a reverse direction upwardly through the first or upper inclined tubular member 26. The reverse in flow counteracts the impact of the water on closed end 82 serving to stabilize the sprinkler unit 10 in its sprinkling position and minimize movement of the sprinkler unit from its sprinkling position.

The upper end 38 of the second or lower inclined tubular member 28 is provided with an end flange 88 adapted for connection to the end flange 24 to provide a fluid-type coupling or connection between the bight portion 16 of the U-shaped tubular member 12 and the second frame section 14. The connection between the end flanges 88 and 24 also provides a support connection between frame sections 12 and 14.

Referring to FIGS. 1-3, a channel frame member 90 with two plate members 91 and 92 is secured by two U- bolts 93 and 94 to the bight portion 16. A plate member 95 is secured to sprinkler pipe 42 opposite plate member 91. Another plate member 96 identical to plate member 95 is secured to sprinkler pipe 42 opposite plate member 92. A strut member 97 is detachably connected to plate members 91 and 95 by suitable fastening means (not shown) such as nuts and bolts. Another strut member 98 identical to strut member 97 is detachably connected to plate members 92 and 96 by suitable fastening means (not shown) such as nuts and bolts. If the single sprinkling means 56 shown in FIG. 3 is used, suitable means (not shown) may be secured to the pipe section 58 for connecting the strut members 97 and 98 between the pipe section 58 and the bight portion 16. If desired, the plate members 91 and 92 or other similar connecting means could be formed integral with the first frame member 12. Likewise, if desired, the plate members 95 and 96 on sprinkler pipe 42 or other similar connecting means could be formed integral with sprinkler pipe 42.

Another pair of strut members 111 and 112 are provided for detachable connection between plate members 95 and 96 on sprinkler pipe 42 and plate members 113 and 114 on the leg portions 18 and 20 by suitable fastening means (not shown) such as nuts and bolts.

A further pair of strut members 117 and 118 are provided for detachable connection between plate members 121 and 122, secured respectively to channel frame member 90 near each leg portion 18 and 20, and plate members 123 and 124 secured respectively to the sprinkler pipe 42 at points spaced away from plate members 95 and 96, by suitable fastening means (not shown) sucha s nuts and bolts.

In the embodiment described and shown in FIGS. 1–3, means for detachably connecting frame sections 12 and 14 are present in the form of connecting strut members 97, 98; 111, 112; 117 and 118, and end flanges 22, 46, 48 and 88. However, it is to be understood that unit 10 need not include all of the strut members 97, 98; 111, 112; or 117, 118 to provide a rigid and stable unit.

If desired two extensible (telescoping) fold-in outrigger stabilizing arms 125 and 126 may be provided to help stabilize the unit 10 in its sprinkling position. Arms 125 and 126 are each pivotally secured at one end thereof by detachable pins 127 and 128 to respective support and mounting brackets 129 and 130 fixed to each end of channel member 90 for pivotal movement about individual horizontal axes (FIGS. 1 and 2). The pivot mountings about pins 127 and 128 allow the arms 125–126 to be set at any necessary angle to the vertical i.e. with respect to leg portions 18 and 20, to provide more stability for the unit during the sprinkling operation. Two rest hooks 131 and 132 are secured respectively to leg portions 18 and 20 for supporting and holding the other ends respectively of the outrigger arms 125 and 126 when they are not in use. The hooks 131 and 132 extend laterally outwardly from first frame member 12 as shown in FIG. 2.

Each arm 125 (or 126) includes a tubular portion 141 (or 142) having aligned holes not shown at one end for receiving pin 127 (or 128), a rod portion 143 (or 144) telescopingly received in the tubular portion 141 (or 142), and a base plate portion 145 (or 146) secured to the outer end of each rod portion 143 (or 144). Each rod portion 143 (or 144) is detachably secured to tubular portion 141 (or 142) by suitable fastening means; such as a bolt not shown in the tubular portion. The arms 125 and 126 can be extended, such as arm 126 in FIG. 2, with base plates 145 and 146 partially wedged in the ground to provide more stability for the unit 10, during the sprinkling operation.

A suitable valve coupling 150 shown in FIG. 1, can be included with the sprinkler unit 10 for detachable connection between an irrigation water supply line and the coupling or fitting 78 on said horizontal tubular member 30 whereby the sprinkler unit 10 can be readily connected and disconnected to an existing irrigation water supply pipe line 81 at spaced intervals along the pipe line 81.

Preferably, the first and second tubular frame members 12 and 14 of the sprinkler unit 10 of this invention are made from a lightweight metal such as aluminum. The inside diameter of the tubular members may be six or eight inches and the bight portion 16 may have a clearance of six to ten feet above the ground. A sprinkler unit with these dimensions will be fairly large in size. However, by using a lightweight metal such as aluminum and by forming the frame sections 12 and 14 out of tubular members in the manner described, a very lightweight sprinkler unit 10 is obtained.

An advantage of the lightweight unit is the ease with which it can be moved from place to place. For example, it can be moved by a smal garden tractor, by a winch, or even pulled by hand.

However, a lightweight sprinkler with the dimensions mentioned above might be unstable in its operating position due to ground irregularities especially if it is used on a windy day where the wind might turn it over on its side. To prevent this from happening, the second or lower inclined tubular member 28 and the inverted, generally U-shaped, tubular member 12 are filled with water to provide sufficient ballast weight for the sprinkler unit 10. Of course, the first or upper inclined tubular member 26 and sprinkler pipe 42 are also filled with water flowing to the sprinklers 52 and 54 and the flowing water adds to the ballast weight. To fill the frame sections 12 and 14 with water, the fitting 78 is first connected to a source of water under pressure. Water will then flow horizontally through the short horizontal tubular member 30 and upwardly through first and second inclined tubular members 26 and 28. The openings in the sprinklers 52, 54 allow the air within tubular member 26 and sprinkler pipe 42 to escape, as the air is compressed by the advancing water, whereby most of the air is purged from member 26 and pipe 42 and sprinkling commences.

In like manner the valve openings in the automatic drain valves 74, 76, without water pressure on the valves, are open and allow air to escape from the second inclined tubular member 28 and the inverted U-shaped tubular member 12, as the air within members 12 and 28 is compressed by the advancing water, until most of the air is purged and the water pressure within the leg portions 18, 20 reaches the pressure needed to close drain valves 74, 76.

With the tubular members 12, 26, 28 and 30 and pipe 42 filled with water, sufficient ballast weight is provided to maintain the sprinkler unit in its sprinkling position even on very windy days.

After sprinkling is finished at one sprinkling position, the fitting 78 is disconnected from the source of water under pressure and the automatic drain valves automatically drain or dump water from the bight portion 16 and leg portions 18 and 20 of the inverted U-shaped tubular member 12 onto the ground. The water in the sprinkler means 40 or 56 will drain downwardly through the first inclined tubular member 26 and horizontally through the short horizonal tubular member 30 onto the ground. Likewise, water in the second inclined tubular member 28 will drain downwardly and then horizontally through the short horizontal tubular member 30 onto the ground. In this way the water for ballast weight will be quickly drained from the sprinkler unit 10 so that the sprinkler unit 10 is again lightweight for ready movement to the next sprinkling position.

Another important feature of the sprinkler unit 10 of this invention is the simplicity of construction and small number of parts needed for the unit. The sprinkler unit 10 can be quickly and easily "broken down" (i.e. disassembled) into the following parts: two wheels 70 and 72, the first frame section 12, the sprinkler means 40 or 56, the second frame section 14 and two or more strut members 97, 98 and/or 111, 112 or 117, 118 along with nuts and bolts or other suitable fastening means for securing the parts together. It will be appreciated, of course, that if desired the component parts could be "broken down" further, e.g. the sprinklers 52 and 54 could be disconnected from sprinkler pipe 42. Thus, the component parts of the sprinkler unit 10 are readily detachable and can be readily assembled in the field; and the unit can be readily disassembled for shipment to other areas to be irrigated with a minimum of labor.

Another advantage to having detachable parts for ready assembly and disassembly is that these parts can be made by mass production rather than on a job shop basis. Then these parts can easily be kept in stock in warehouses throughout the country whereby they can be readily ordered through a catalogue and quickly delivered. Additionally, if a part is lost, broken or defective, a replacement part can be easily and quickly obtained. This results in a very attractive sprinkler unit to farmers who wish to avoid delay in obtaining parts for the unit when they are needed.

A further important advantage of the invention is its particular design. Referring to FIG. 2, it will be appreciated that as the sprinkling unit 10 is moved through a field, two leg portions 18 and 20 and the second frame section 14 intermediate the leg portions 18 and 20 present a very narrow profile to the crop through which it is moved and with no wide portions extending in the path of movement of the unit, which, if present, could cause significant damage to the crops in the path of movement of the unit 10.

The sprinkler unit 10 of this invention has been found to work quite well with a winch arrangement for pulling the unit 10 through a field with the unit straddling several rows of the crop. In this method of sprinkling, the sprinkler unit 10 is positioned up field with a supply of irrigation pipe line connected between the unit 10 and a source of water under pressure. The winch is secured to a position down field with a cable connecting the winch to the sprinkler unit 10. Water under pressure is then admitted to the unit to start the sprinkling operation. After sprinkling at the first position is completed, the winch is operated by suitable power means to pull the unit 10 down field to the second sprinkling position for sprinkling, then to the third sprinkling position, etc., until the unit 10 is pulled to the end of the field. In this operation suitable wheel means are provided for supporting and carrying the short horizontal tubular member 30. Also the leg portions 18 and 20 and second frame section 14 are disposed in the spaces between several rows of crop, so that the unit 10 straddles several rows for movement parallel to the rows. Typically, the clearance between the bight portion and the ground is about 7 feet so that the unit 10 can be moved through a field of tall crop, such as corn, parallel to the rows of crop with minimal damage to the crop.

Of course, the sprinkler unit 10 also can be moved through crops of low height with a minimum of damage to the crop. Thus, the sprinkler unit 10 of this invention is very versatile and can be used for sprinkling a variety of crops, nursery stock, small trees, grass and the like.

Another advantage of this sprinkler unit is that it can use a boom sprinkler of high capacity. For example, the sprinkler 52, 54 or 62 could be a boom sprinkler, ranging in size from one which handles 300 gallons per minute and covers a circle of 360 feet to one which handles 1200 gallons per minute and covers a quarter mile of 80 rod area.

While several embodiments of the invention have been shown and described, other forms will be apparent to those skilled in the art. Therefore, it is not intended to limit the invention to the specific embodiments shown it being understood that variations may be made from these specific embodiments provided they are within the scope of the invention as defined in the following claims.

I claim:

1. A mobile sprinkler unit for irrigating crops and the like, comprising: an upwardly extending, generally inverted, U-shaped tubular member including a bight portion and two leg portions; a wheel connected at the lower end of each leg portion; a fore and aft extending frame section including upper and lower inclined tubular members and a short tubular member interconnecting the lower ends, respectively, of said upper and lower inclined tubular members; sprinkler means connected to the upper end of said upper inclined tubular member, said short tubular member including a coupling for connection to a source of water under pressure, said bight portion of said U-shaped tubular member being connected to the upper end of said lower inclined tubular member in a manner providing a fluid-type connection between said bight portion and said lower inclined tubular member so that water will fill said lower inclined tubular member and said inverted U-shaped tubular member to provide ballast weight for said sprinkler unit when it is in operation; and drain means on the lower ends of said leg portions for draining said inverted U-shaped tubular member when said coupling is disconnected from said source of water under pressure.

2. A mobile sprinkler unit as set forth in claim 1 wherein said sprinkler means comprises a pipe section and a sprinkler connected to one end of said pipe section with the other end of said pipe section being connected to said upper end of said upper inclined tubular member.

3. A mobile sprinkler unit as set forth in claim 1 wherein said sprinkler means comprises a horizontal sprinkler pipe and a plurality of sprinklers on said sprinkler pipe with said sprinkler pipe being connected to said upper end of said upper inclined tubular member.

4. A lightweight mobile sprinkler unit for irrigating crops and the like, comprising: first and second detachable frame sections; said first frame section comprising an upwardly extending, generally inverted, U-shaped member having a bight portion and two leg portions, a wheel detachably connected to the lower end of each leg portion; said second frame section including a short tubular member and an inclined tubular member, the lower end of said inclined tubular member being secured to and opening into said short tubular member; said short tubular member including a coupling for connection to a source of water under pressure, the upper end of said second frame section being adapted for detachable fluid-type connection to the bight portion of said U-shaped member, and sprinkler means adapted for removable connection to and communication with the upper end of said inclined tubular member.

5. A mobile sprinkler unit as set forth in claim 4 wherein said sprinkler means comprises a pipe section and a sprinkler connected to one end of said pipe section with the other end of said pipe section being connected to said upper end of said inclined tubular member.

6. A mobile sprinkler unit as set forth in claim 4 wherein said sprinkler means comprises a horizontal sprinkler pipe and a plurality of sprinklers on said sprinkler pipe with said sprinkler pipe being connected to said upper end of said inclined tubular member.

7. A mobile sprinkler unit as set forth in claim 4 wherein said short tubular member is horizontally disposed and includes a hitch means for connection to power means for moving said sprinkler unit.

8. A mobile sprinkler unit as set forth in claim 4 wherein said short tubular member includes jack means for providing a three point support for said sprinkler unit on said two wheels and said jack means.

9. A mobile sprinkler unit as set forth in claim 4 wherein a caster wheel is secured to said short tubular member to provide, with said two wheels on said first frame section, a three point support for said unit and to allow for easy movement of said unit.

10. A mobile sprinkler unit as set forth in claim 4 wherein said short tubular member extends horizontally fore and aft, said coupling being at the end of said short tubular member which is closest to said U-shaped member, the other end of said short tubular member being closed, said lower end of said inclined member is connected to said short tubular member at a point adjacent said closed end thereof and inclines upwardly toward said inverted U-shaped tubular member so that the direction of the flow of water through said sprinkler unit is reversed as the water flows from said short tubular member into said inclined tubular member, the reversing of the direction of flow of the water through the sprinkling unit counteracts the impact of the water on said closed end of said short tubular member and thereby stabilizes said sprinkler unit in its sprinkling position.

11. A mobile sprinkler unit as set forth in claim 4 wherein at least one pair of detachable strut members are provided for connection between said leg portions of said inverted U-shaped member and said sprinkler means, said strut members constituting part of the means for detachably connecting the upper end of said second frame section to said first frame section.

12. A mobile sprinkler unit as set forth in claim 4 wherein at least one pair of detachable strut members are provided for connection between said bight portion of said inverted U-shaped member and said sprinkler means, said strut members constituting part of the means for detachably connecting the upper end of said second frame section to said first frame section.

13. A mobile sprinkler unit as set forth in claim 4 comprising two extensible fold-in outrigger arms, each arm being pivotally secured at one end thereof to the top of said first frame section, and holding means on said unit for holding the other end of each arm to said unit when said arms are not in use.

14. A mobile sprinkler unit as set forth in claim 4 wherein said inverted U-shaped member is tubular, said second frame section comprises a second inclined tubular member disposed below said first inclined tubular member, the lower end of said second inclined tubular member being secured to and opening into said short tubular member, the upper end of said second inclined tubular member being detachably connected to said bight portion of said inverted U-shaped tubular member in a manner providing a fluid-type connection between said bight portion and said second inclined tubular member, so that said second inclined tubular member and said inverted U-shaped tubular member are filled with water to provide ballast weight for the sprinkler unit when it is in operation, and drain means are provided for draining said inverted U-shaped tubular member when said short tubular member is disconnected from said source of water under pressure.

15. A mobile sprinkler unit as set forth in claim 14 wherein said second inclined tubular member is drained when said coupling on said short tubular member is disconnected from said source of water under pressure and said drain means for draining said inverted U-shaped tubular member comprises automatic drain valve means connected to the lower end of each leg portion, said automatic drain valve means being of the type which are normally closed when under a pressure greater than the head pressure equal to the height of said first frame section and which will otherwise be open.

16. A mobile sprinkler unit as set forth in claim 14 wherein a strut is secured to said first and second inclined tubular members at a point near the upper ends, respectively, of said first and second inclined tubular members to rigidly fix said inclined tubular members with respect to each other.

References Cited

UNITED STATES PATENTS 3,158,892  12/1964  Bridger et al. _____ 239—460 X

M. HENSON WOOD, JR., Primary Examiner

MICHAEL Y. MAR, Assistant Examiner